United States Patent
Lin et al.

(10) Patent No.: US 7,624,101 B2
(45) Date of Patent: Nov. 24, 2009

(54) ENHANCED SEARCH RESULTS

(75) Inventors: Walt Lin, New York, NY (US); Sean Dorward, Martinsville, NJ (US); Luis Castro, Piscataway, NJ (US)

(73) Assignee: Google Inc., Mountain View, CA (US)

( * ) Notice: Subject to any disclaimer, the term of this patent is extended or adjusted under 35 U.S.C. 154(b) by 5 days.

(21) Appl. No.: 11/343,198

(22) Filed: Jan. 31, 2006

(65) Prior Publication Data
US 2007/0192289 A1    Aug. 16, 2007

(51) Int. Cl.
*G06F 17/30* (2006.01)
(52) U.S. Cl. .................. 707/3; 707/2; 707/4; 707/5; 707/6; 707/7; 707/10; 707/102
(58) Field of Classification Search ............ 707/2, 707/3, 4, 5, 6, 7, 10, 102
See application file for complete search history.

(56) References Cited

U.S. PATENT DOCUMENTS

| | | | | |
|---|---|---|---|---|
| 7,152,064 | B2 * | 12/2006 | Bourdoncle et al. ........... | 707/5 |
| 2004/0073538 | A1 * | 4/2004 | Leishman et al. ............. | 707/3 |
| 2005/0060310 | A1 * | 3/2005 | Tong et al. .................... | 707/7 |
| 2005/0071328 | A1 * | 3/2005 | Lawrence ...................... | 707/3 |
| 2006/0069670 | A1 * | 3/2006 | Khaliq et al. .................. | 707/3 |
| 2006/0101003 | A1 * | 5/2006 | Carson et al. ................. | 707/3 |

OTHER PUBLICATIONS

PCT/US2007/061350 International Search Report with Written Opinion, Jun. 4, 2007, 12 pages.
R. Lemmens et al., "Semantic Matchmaking in Geo Service Chains: Reasoning with a Location Ontology", Proceeedings of the 15th International Workshop on Database and Expert Systems Applications, DEXA 2004, 6 pages.
R. Lee et al., "Optimization of Geographic Area to a Web Page for Two-Dimensional Range Query Processing", Proceedings of the Fourth International Conference on Web Information Systems Engineering Workshops WISEW, Dec. 2003, 9 pages.
J. Zhang et al., "A GML-Based Open Architecture for Building a Geographical Information Search Engine Over the Internet", IEEE 2002, pages 25-32.
F. Hansen et al., "Integrating the Web and the World: Contextual Trails on the Move", XP-002432570, ACM, Aug. 2004, pp. 98-107.
J. Govindarajan et al., "Geo Viser- Geographic Visualization of Search Engine Results", Database and Expert Systems Applications, IEEE Computer Society, US, Sep. 1999, pp. 269-273.
Ravinarayanan, Kalpana; Fewer clicks, more answers . . . ; Sep. 20, 2005; http://www.ysearchblog.com/archives/000187.html, 3 pages.
International Preliminary Report on Patentability mailed Aug. 14, 2008 issued in corresponding international application No. PCT/US2007/061350, 8 pages.

* cited by examiner

*Primary Examiner*—Jean B. Fleurantin
*Assistant Examiner*—Phong Nguyen
(74) *Attorney, Agent, or Firm*—Harrity & Harrity, LLP

(57) ABSTRACT

A method includes receiving a search query from a user and generating search results based on the search query. The method may also include providing the search results and information identifying at least one of a telephone number or an address associated with a first one of the search results to the user. The method may further include providing a link to a map associated with at least the first search result to the user.

32 Claims, 9 Drawing Sheets

900

Address: http://www.google.com/local?hl=en&lr=&rls=RTNSJ-en&sa=N-1&safe=off&client=firefox-a&rls=org.mozilla:en-US:official&q=clift&near=San+Francisco,+CA&sa=X&radius=0.0&latlng=37775000,-122418333,16134392367 1074

Help

Google Local

| Web | Images | Groups | News | Froogle | Local^new! | more » | clift    San Francisco, CA    [Search]    Search the map
What e.g. pizza    Where e.g. Poughkeepsie, NY    Find businesses
                                                  Get Directions Local                                             Results 1-10 of about 1,278 for clift near San Francisco, CA

Clift
(800) 652-5438
(415) 775-4700
(415) 441-4621
(415) 776-9238
495 Geary St
San Francisco, CA 94102
0.9 mi NE - Directions

[Map] [Sat] [Hyb]

— 910

View Legal Map

920

Conferences: Für kleinere wie größere Gruppen stehen
begrenzt Tagungsräume zur Verfügung. Der...
Nearest Train: ???387 Geary
Special Feature: Die Wandtäfelung des berühmten Redwood
Restaurants mit Bar wurde aus einem der...
Number Of Rooms: 326
Neighborhood: Downtown, Innenstadt
More from Wcities.com »

Payment Accepted: American Express, Diners Club,
Discover, MasterCard, Visa
Check-in: 3 pm
Rooms: 374
Check-out: 1 pm
Mobil Star Rating: 3
More from MobilTravelGuide.com »

Hours: Open Daily 5pm-2am
Payment Accepted: Diners Club, MasterCard, Visa
Specialty: 30+ Singles Bar, Bar Food, First Date, Hotel Bar,
Martini, See and Be Seen, Signature Drinks
Tip: Score coveted couch space by making reservations: (415)
929-2344. Otherwise, the Family Room...
More from Citysearch.com »

Star Rating: 5 Stars
30-day Average Price: $235 and up weekdays - $235 and up
weekends
More from Sidestep.com »

930

Parking: Valet
Payment Accepted: Cash,Visa,Master
Card,Discover,American Express,Diner's Club
Food: Bar / Lounge, Restaurant
Property Features: Business Center, Disabled Accessible,
Meeting Rooms, Newsstand / Gift Shop, Suites
Type: Luxury Hotels
More from 10best.com »

Parking: Valet parking $40
In Room Amenities: TV/DVD, hair dryer, iron, minibar
Transportation: Cable car: Powell-Hyde and Powell-Mason
lines (2 blocks east). Bus: 2, 3, 4, 30, 38...
Payments Accepted: AE, DC, MC, V
More from Frommers.com »

Cuisine: Californian, Eclectic, French, French Nouveau
Entertainment: Live Music
More from RestaurantRow.com »

Hours: Open Mon-Thu, Sun 5pm-2am; Fri-Sat 4pm-2am
Features: Bars, Bars & Pubs
More from Wcities.com »

FIG. 9

ENHANCED SEARCH RESULTS

BACKGROUND OF THE INVENTION

1. Field of the Invention

Implementations described herein relate generally to information retrieval and, more particularly, to providing information in response to a search query.

2. Description of Related Art

The World Wide Web ("web") contains a vast amount of information. Locating a desired portion of the information, however, can be challenging. This problem is compounded because the amount of information on the web and the number of new users inexperienced at web searching are growing rapidly.

Search engines attempt to return hyperlinks to web pages in which a user is interested. Generally, search engines base their determination of the user's interest on search terms (called a search query) entered by the user. The goal of a search engine is to provide links to high quality, relevant search results (e.g., web pages) to the user based on the search query. Typically, the search engine accomplishes this by matching the terms in the search query to a corpus of pre-stored web pages. Web pages that contain the user's search terms are "hits" and are returned to the user as links.

When a user of an existing search engine receives links to web pages of various web sites, the user is often interested in identifying contact information associated with one or more of the web sites. For example, the user may be interested in identifying contact information for a business that is associated with one of the web sites. In this case, the user may select one of the links in an attempt to find the contact information. In many situations, the contact information is not located on the selected web page. In this case, the user may navigate from this first web page to other web pages on the same web site to attempt to find the desired information. This may involve clicking through a number of web pages until the user is able to find the information of interest.

SUMMARY OF THE INVENTION

According to one aspect, a method may include receiving a search query from a user and generating search results based on the search query. The method may also include providing the search results and information identifying at least one of a telephone number or an address associated with at least a first one of the search results to the user. The method may further include providing a link to a map associated with at least the first search result to the user.

In another aspect, a system that includes a computer-readable medium containing instructions and a processor coupled to the computer-readable medium is provided. The processor executes the instructions to cause the processor to generate search results based on a search query and provide the search results and information identifying a telephone number and address associated with at least a first one of the search results to a user. The instructions also cause the processor to provide a link to a map associated with at least the first search result to the user.

In a further aspect, a system including a memory and a search engine is provided. The memory stores information associated with a plurality of businesses. The search engine determines whether first information associated with a first one of the plurality of businesses includes information identifying a web page. The search engine also identifies at least some of the first information associated with the first business when the first information includes information identifying a web page and stores the identified information with the web page in a second database.

In still another aspect, a method may include receiving a search query from a user and generating search results based on the search query. The method may also include determining whether a web page associated with a first one of the plurality of search results includes a single address and telephone number and providing the search results and information identifying the address and telephone number associated with the first search result to the user, when the web page includes a single address and telephone number. The method may further include providing a link to a map associated with the first search result to the user.

BRIEF DESCRIPTION OF THE DRAWINGS

The accompanying drawings, which are incorporated in and constitute a part of this specification, illustrate an embodiment of the invention and, together with the description, explain the invention. In the drawings.

FIGS. 8 and 9 illustrate exemplary interface screens provided to a user in an implementation consistent with the principles of the invention.

DETAILED DESCRIPTION

The following detailed description refers to the accompanying drawings. The same reference numbers in different drawings may identify the same or similar elements. Also, the following detailed description does not limit the invention.

Overview

Systems and methods consistent with the principles of the invention may provide search results that include a number of links associated with the search query. Along with the links, additional information, such as contact information to help a user locate a particular business, may be provided to the user. The additional information may help the user obtain information of interest very quickly.

Figure 1:
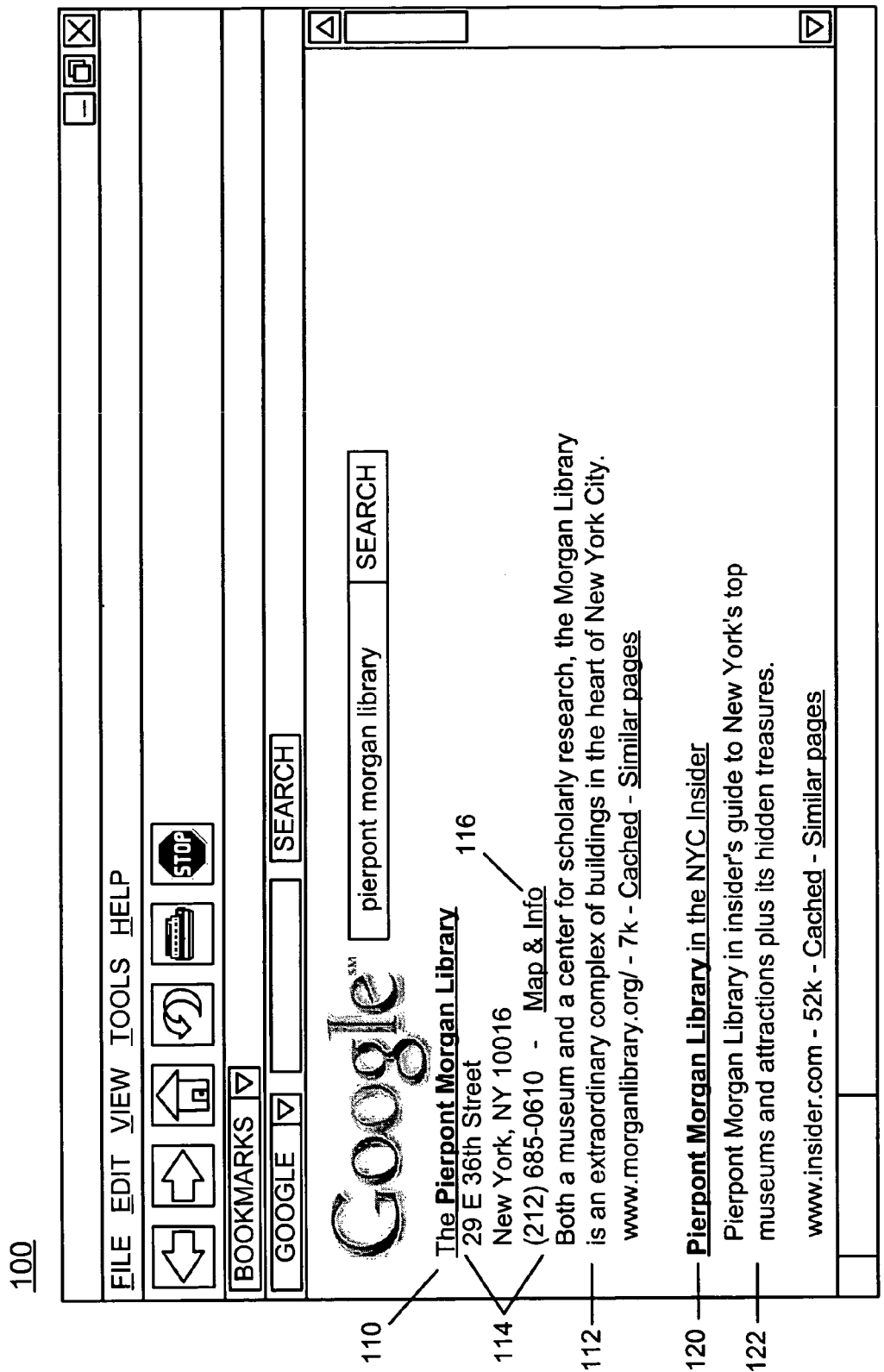
FIG. 1 is an exemplary diagram illustrating a concept consistent with the principles of the invention.

FIG. 1 is an exemplary diagram illustrating an exemplary concept consistent with the principles of the invention. As shown in FIG. 1, an interface screen 100 provided to a user in response to a search for Pierpont Morgan library include links 110 and 120 and a brief description of the links at areas 112 and 122, respectively.

In accordance with principles consistent with the invention, the search engine also returns additional information to the user. For example, referring to FIG. 1, the search engine may identify an address and/or telephone number of one or more of the links and provide this information to the user, as illustrated at area 114. Providing the address and telephone number for one or more of the documents may enable a user to obtain the desired information without having to select any of the links. In addition, the search engine may also provide a link to a map and other information, as indicated at area 116. By clicking on the Map & Info link at area 116, a map showing the location of the item of interest and/or additional information associated with the item of interest may be provided. In this manner, enhanced search results are provided to the user that enables the user to easily identify information that may be of interest to the user.

In the description to follow, the term "document" is to be broadly interpreted to include any machine-readable and machine-storable work product. A document may include, for example, a web page, information relating to a news event, an image file, information relating to a merchant product, information relating to a usenet page, a yellow page entry, a scanned book, a file, a combination of files, one or more files with embedded links to other files, a blog, a web advertisement, an e-mail, etc. Documents often include textual information and may include embedded information (such as meta information, hyperlinks, etc.) and/or embedded instructions (such as Javascript, etc.). A "link," as the term is used herein, is to be broadly interpreted to include any reference to/from a document from/to another document or another part of the same document.

Exemplary Network

Figure 2:
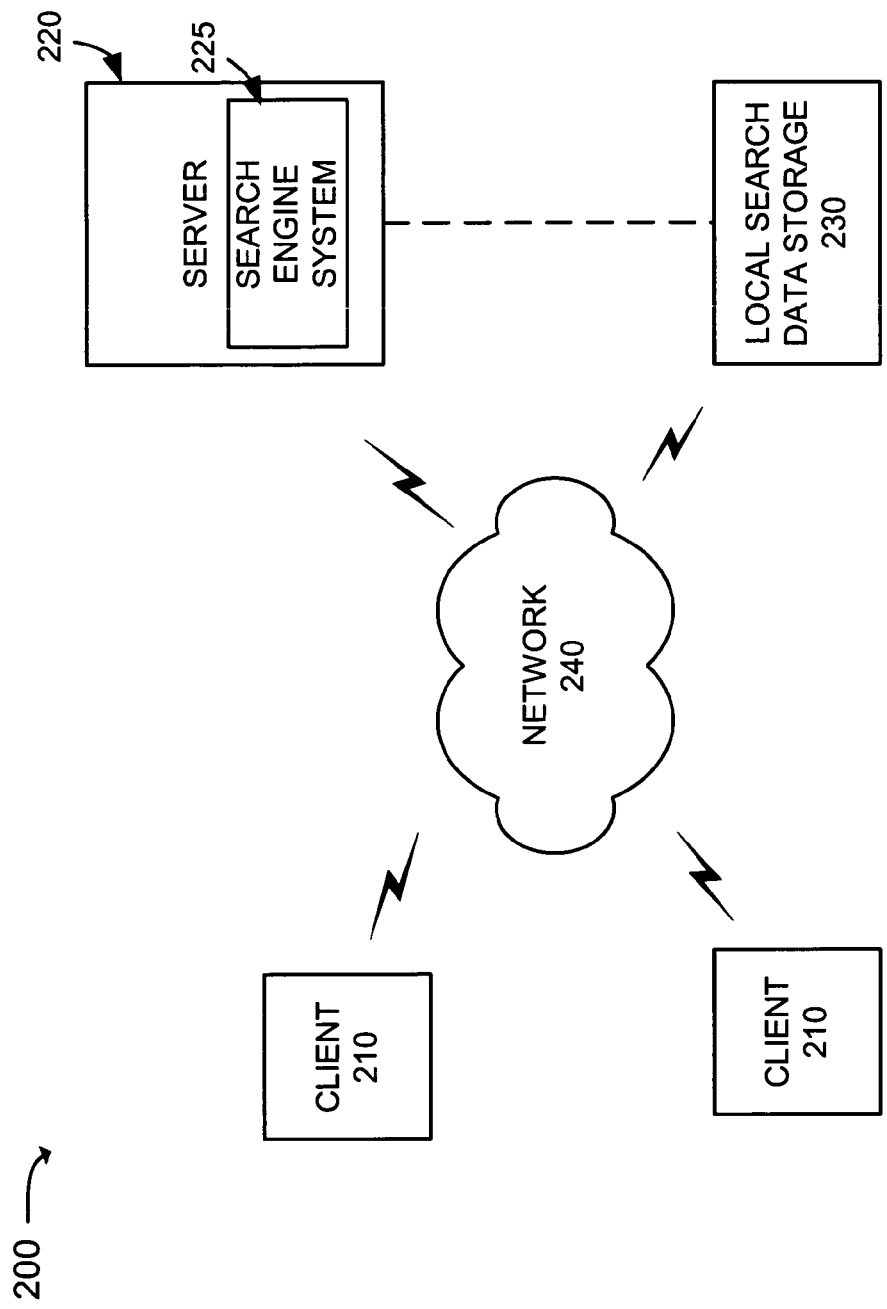
FIG. 2 is an exemplary diagram of a network in which systems and methods consistent with the principles of the invention may be implemented.

FIG. 2 is an exemplary diagram of a network 200 in which systems and methods consistent with the principles of the invention may be implemented. Network 200 may include clients 210, server 220 and local search data storage 230 connected via network 240. Two clients 210, one server 220 and one local search data storage 230 have been illustrated as connected to network 240 in FIG. 2 for simplicity. In practice, there may be more or fewer clients, servers and data storage devices. Also, in some instances, a client may perform a function of a server and a server may perform a function of a client. Additionally, in alternative implementations, the functions performed by one device may be performed by another device or may be combined with the functions performed by another device/system.

Clients 210 may include client entities. An entity may be defined as a device, such as a personal computer, a wireless telephone, a personal digital assistant (PDA), a lap top computer, or another type of computation or communication device, a thread or process running on one of these devices, and/or an object executable by one of these devices.

Server 220 may include one or more server entities that gather, process, search, maintain, manage documents and/or provide search results to users. In an exemplary implementation consistent with principles of the invention, server 220 may include search engine system 225 usable by clients 210. Search engine system 225 may receive search queries from clients 210 and return relevant information to clients 210. In an exemplary implementation, search engine system 225 may include one or more components that gather, process and maintain information for generating search results. In addition, search engine system 225 may include a "local" search engine that provides results to a user based on geographical information provided to search engine system 225.

Local search data storage 230 may include information associated with locations of interests, such as companies/businesses, organizations, schools, libraries, etc. For example, local search data storage 230 may include a business' name, address and/or telephone number. In an exemplary implementation, local search data storage 230 may be populated with information received from entities (not shown in FIG. 2) that collect and provide information regarding businesses, such as yellow pages information or other information associated with businesses. For example, local data storage 230 may be populated with information received from third parties, such as InfoUSA, Acxiom, etc. An entity associated with local search data storage 230, such as a local search engine system included in search engine system 225 may also scan or review web pages to identify information that is to be stored in local search data storage 230. These records may then be clustered or gathered together for each business, organization, etc. and stored in local search data storage 230. The records for each business/organization stored in local search data storage 230 may be indexed by an identifier (ID), referred to herein as a cluster ID, that identifies the particular records associated with the business/organization. In some implementations, the cluster ID may be the name of the business. Search engine system 225 may use information in local search data storage 230 when returning search results to a user, as described in more detail below.

Network 240 may include a local area network (LAN), a wide area network (WAN), a telephone network, such as the Public Switched Telephone Network (PSTN), an intranet, the Internet, a different type of network, or a combination of networks. Clients 210 and server 220 may connect to network 240 via wired, wireless, or optical connections. In alternative implementations, one or more of the devices illustrated in FIG. 2 may be directly connected to another one of the devices. For example, in one implementation consistent with the principles of the invention, server 220 may be directly connected to local search data storage 230, as illustrated by the dotted line in FIG. 2. In still other alternatives, local search data storage 230 may be part of search engine system 225.

In addition, server 220 and local search data storage 230 are illustrated in FIG. 2 as being single devices. It should be understood, however, that server 220 and local search data storage 230 may each be implemented as a network of computer processors, servers and/or databases.

Exemplary Server Architecture

Figure 3:
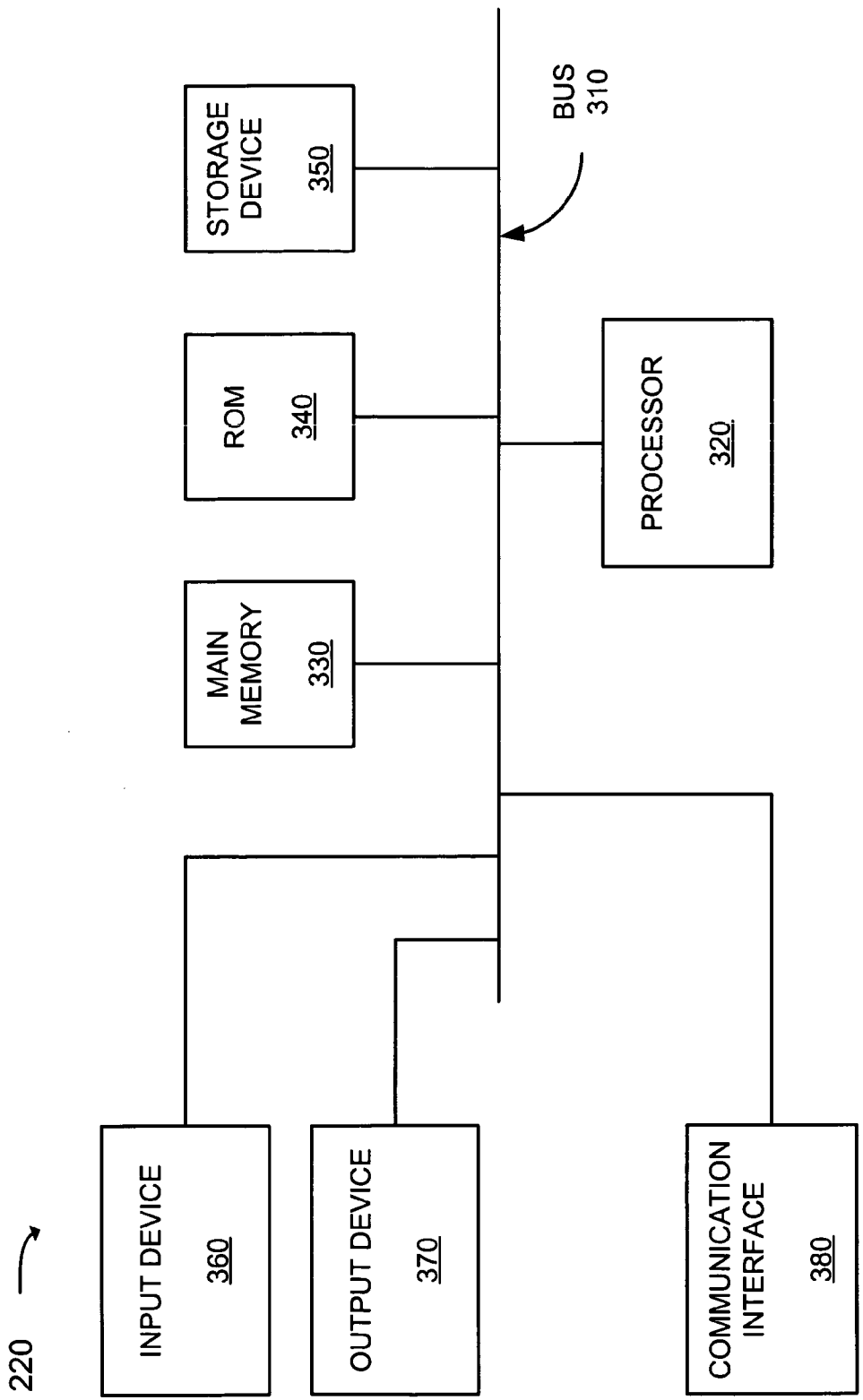
FIG. 3 is an exemplary diagram of a server in the network of FIG. 2 in an implementation consistent with the principles of the invention.

FIG. 3 is an exemplary diagram of server 220 in an implementation consistent with the principles of the invention. Server 220 may include bus 310, processor 320, main memory 330, read only memory (ROM) 340, storage device 350, one or more input devices 360, one or more output devices 370, and a communication interface 380. Bus 310 may include a path that permits communication among the components of server 220.

Processor 320 may include any type of conventional processor, microprocessor or processing logic that interprets and executes instructions. Main memory 330 may include a random access memory (RAM) or another type of dynamic storage device that stores information and instructions for execution by processor 320. ROM 340 may include a conventional ROM device or another type of static storage device that stores static information and instructions for use by processor 320. Storage device 350 may include a magnetic and/or optical recording medium and its corresponding drive.

Input device 360 may include one or more conventional mechanisms that permit a user to input information to server 220, such as a keyboard, a mouse, a pen, voice recognition and/or biometric mechanisms, etc. Output device 370 may include one or more conventional mechanisms that output information to the user, such as a display, a printer, a speaker, etc. Communication interface 380 may include any transceiver-like mechanism that enables server 220 to communicate with other devices and/or systems. For example, communication interface 380 may include mechanisms for communicating with another device or system via a network, such as network 240.

Server 220, consistent with the principles of the invention, may perform searches based on inputs from clients 210. Server 220 may perform these operations in response to processor 320 executing software instructions contained in a computer-readable medium, such as memory 330. A computer-readable medium may be defined as one or more memory devices and/or carrier waves.

The software instructions may be read into memory 330 from another computer-readable medium, such as data storage device 350, or from another device via communication interface 380. The software instructions contained in memory 330 causes processor 320 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Figure 4:
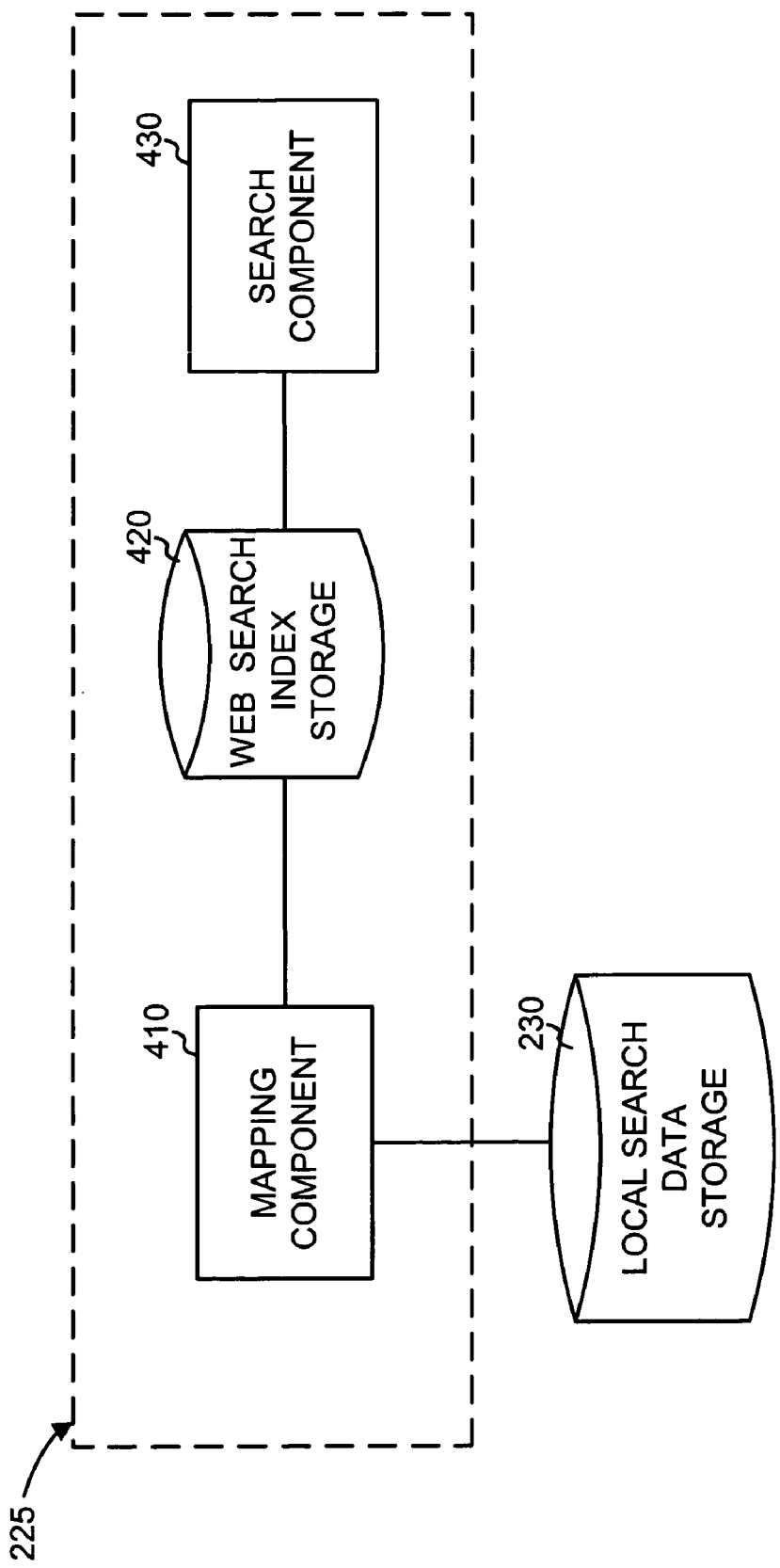
FIG. 4 is an exemplary functional block diagram illustrating a search engine system in an implementation consistent with the principles of the invention.

FIG. 4 is an exemplary functional block diagram of search engine system 225, according to an implementation consistent with principles of the invention. Search engine system 225 may include mapping component 410, web search index storage 420 and search component 430. The functional blocks illustrated in FIG. 4 may be implemented in software, hardware, or a combination of hardware and software. In addition, each of the functional blocks may represent one or more computer processors, threads, and/or objects. It should also be understood that in alternative implementations, the functions performed by one of the functional blocks in FIG. 4 may be performed by another functional block. Further, in alternative implementations, a single functional block/processing device may perform the functions of search engine system 225.

Mapping component 410 may create a mapping from a web page to local search related information, such as an address and/or telephone number of a business for which the web page is a home page. Mapping component 410 may store the local search related information in web search index storage 420 along with the document with which the local search related information is associated. For example, web search index storage 420 may store an address and telephone number for a business with the document (e.g., web page) for which the address and telephone number are related. This information may then be provided to the user in response to a search query, as described in more detail below.

Local search data storage 230, as described above, may include a list of businesses, organizations, schools, libraries, etc., and data associated with these entities. For example, as described previously, local search data storage 230 may store records for a business/organization that are indexed by a cluster ID.

Figure 5:
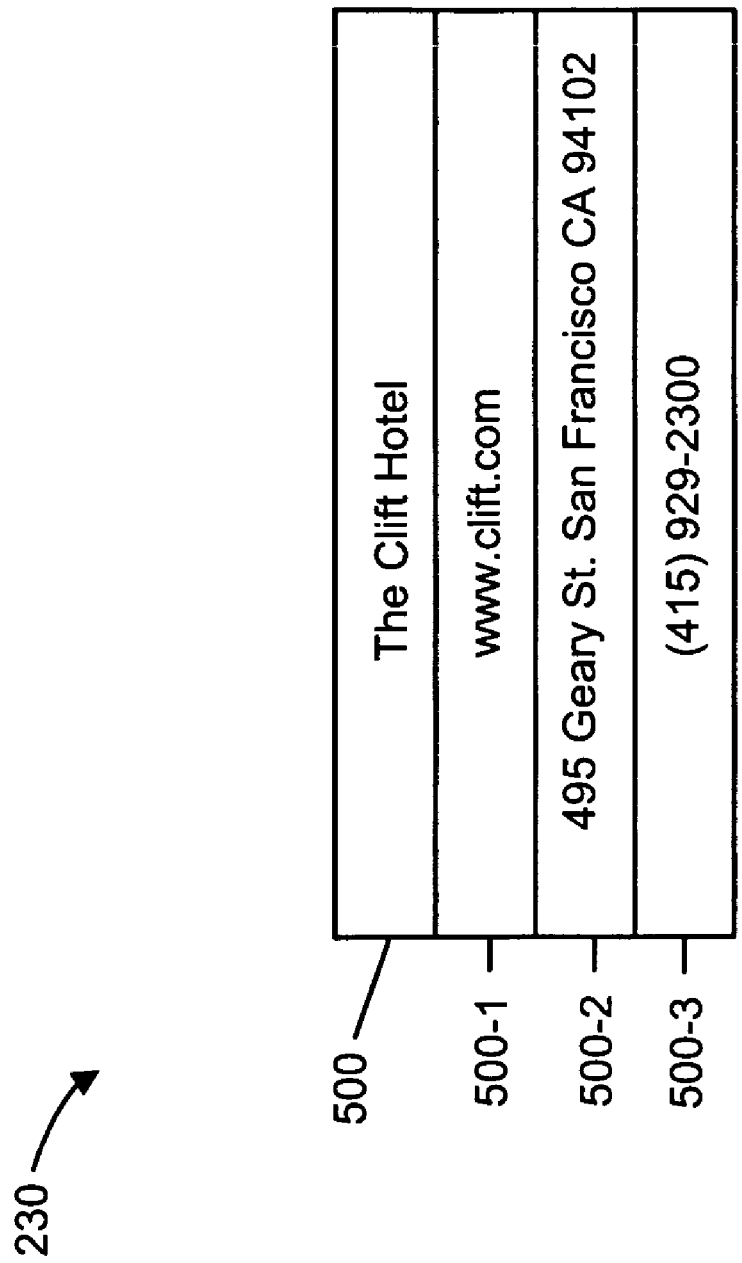
FIG. 5 illustrates an exemplary portion of the local search data storage of FIG. 2 in an implementation consistent with the principles of the invention.

FIG. 5 illustrates an exemplary portion of local search data storage 230. Referring to FIG. 5, local search data storage 230 may include an entry 500 and sub-entries 500-1, 500-2 and 500-3 associated with entry 500. In the example illustrated in FIG. 5, entry 500 stores "The Clift Hotel" and entry 500 may be a cluster ID corresponding to the Clift Hotel or www.clift-.com. Sub entry 500-1 stores a web site address associated with the Clift Hotel, sub entry 500-2 stores a street address for the Clift Hotel in San Francisco, Calif. and sub entry 500-3 stores a telephone number for the Clift Hotel. Local search data storage 230 may also include additional information associated with entry 500, such as additional locations and/or telephone numbers associated with entry 500. Local search data storage 230 may further store additional information associated with entry 500, such as prices for rooms at the hotel, ratings for the hotel, etc. This additional information may be provided to a user after the user selects a link provided with the search result, as described in more detail below.

Local search data storage 230 may store similar information for a number of other companies/businesses, schools, libraries, organizations, etc. Mapping component 410 may use the information in local search data storage 230 to create a mapping from information in web search index storage 420 to information in local search data storage 230, as described in more detail below.

Referring back to FIG. 4, search component 430 may receive a search query from a client 210. Search component 430 may access web search index storage 420 to generate search results that identify relevant documents based on the search query. The relevant documents may also include local information associated with the particular documents. Search engine system 225 may then forward the search results and local information to the client 210 that submitted the original search query, as described in more detail below.

Exemplary Processing

Figure 6:
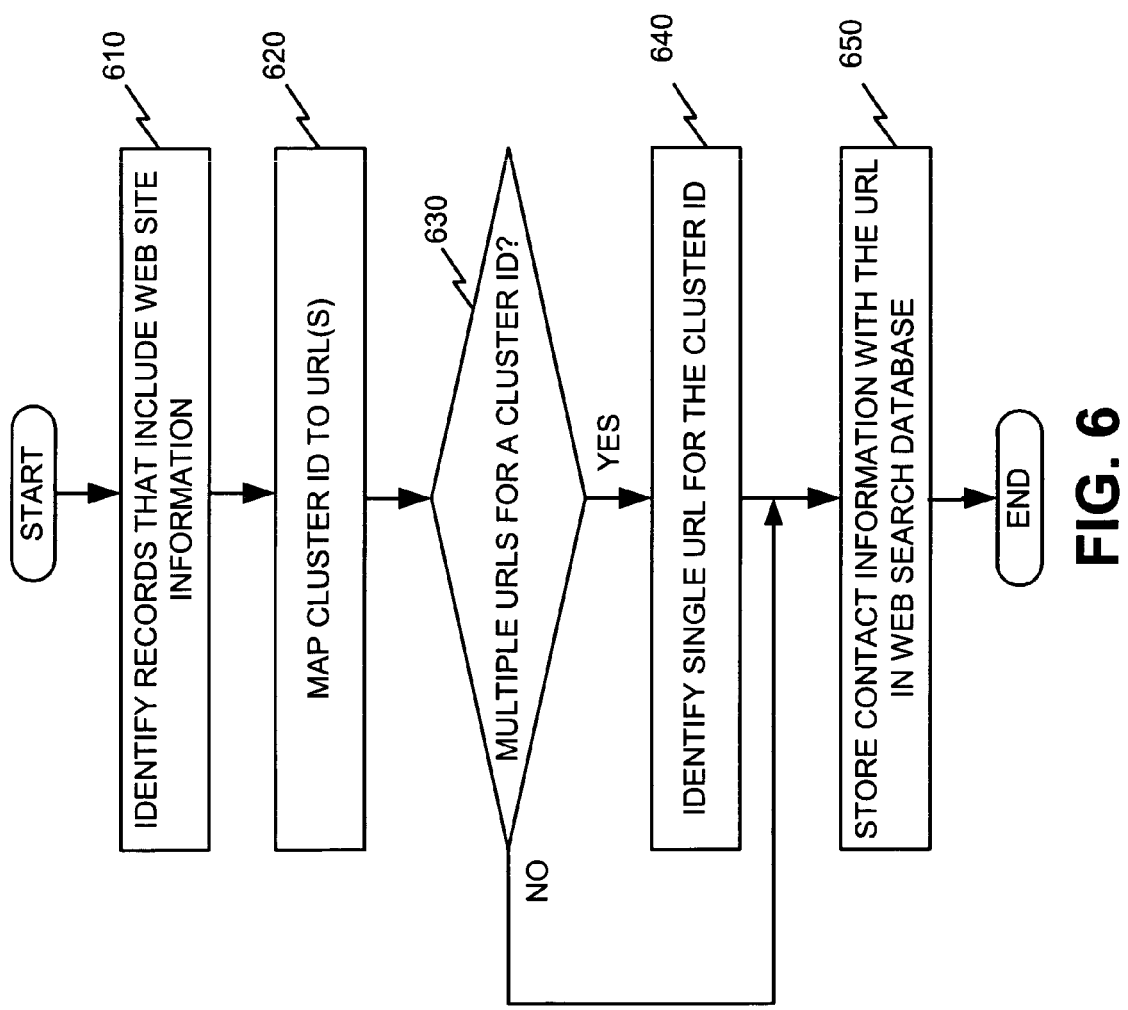
FIG. 6 is a flow diagram illustrating exemplary processing associated with mapping local search related information to a web page.

FIG. 6 is a flow diagram illustrating exemplary processing associated with mapping local search related information to a web page consistent with the principles of the invention. Processing may begin by mapping component 410 examining each of the records stored in local search data storage 230 to identify records that include a web site (act 610). For example, mapping component 410 may identify the records associated with entry 500 and determine that the records associated with entry 500 include the web site www.clift-.com.

Mapping component 410 may then take the records associated with a cluster ID that includes web site information and map the cluster ID to which the record belongs to the URL of the web site (act 620). In the example above, mapping component 410 may map "Clift Hotel" to www.clift.com, which may represent the home page of the Clift Hotel.

In some instances, a single cluster ID may include records that include a number of URLs. In these instances, mapping component 410 may then determine whether multiple URLs exist for any of the cluster IDs (act 630). If multiple URLs exist for a single cluster ID, mapping component 410 may identify one of the URLs for that particular cluster ID (act 640).

For example, in one implementation, mapping component 410 may identify one URL from multiple URLs associated with a cluster ID by examining which sources or feeds provided the URLs for that cluster ID. That is, mapping component 410 may identify a feed from one particular source, such as InfoUSA, as being more likely to contain useful and/or reliable information than information from another source. Mapping component 410 may then identify the URL from the more reliable source when mapping the cluster ID to a URL.

Alternatively, mapping component 410 may access the web pages corresponding to the multiple URLs and determine if the address and telephone number included in the records associated with the cluster ID match the information on one of the web pages corresponding to the URLs. If the information on one of the web pages matches the address and telephone number stored in local search data storage 230, mapping component 410 may select that URL as being the correct URL to map to the cluster ID.

In still further alternatives, mapping component 410 may perform a "WHOIS" query with a domain name registry entity, such as Network Solutions. The WHOIS query will provide a business name, address and telephone number associated with a domain name. If the information provided in response to the WHOIS query matches the address and telephone number stored in local search data storage 230, mapping component may select that URL as being the correct URL to map to the cluster ID.

In addition to attempting to identify supporting evidence regarding mapping a URL to a cluster ID in local search data storage 230, search engine system 225 may also look for conflicting information to identify the appropriate URL. For example, if the address and/or telephone number included on a web page corresponding to one of the URLs conflicts with the address and/or telephone number that is stored in local search data storage 230, search engine system 225 may discount or ignore that URL for mapping purposes. Further, if search engine system 225 finds many addresses on a web page corresponding to one of the URLs, this may indicate that the URL/web site is a directory site. In this case, search engine system 225 may discount or ignore that URL for mapping purposes.

In one implementation consistent with the invention, search engine system 225 may also determine not to map a cluster ID to a URL based on the size of the web site associated with the URL. For example, suppose that the URL is www.dell.com. In this case, the contact information associated with dell.com stored in local search data storage 230 may not be of practical value to a user since the contact information may be merely a corporate address and general telephone number. Therefore, search engine system 225 may determine the number of web pages associated with a web site for which the URL is one of the web pages. If the number of web pages on the web site exceeds a predetermined number, search engine system 225 may determine that the contact information for that URL should not be provided to the user. It should be understood that the predetermined number of web pages that are used to indicate that the URL and contact information associated with that URL should not be displayed may be any particular number. This allows search engine system 225 to not provide contact information (e.g., address and telephone number) when the information is not likely to be of value to a user. Therefore, in some instances, search engine system 225 may not map a cluster ID to a URL even when the information for the URL matches the information stored in local search data storage 230.

After mapping the local search cluster ID to a URL, mapping component 410 may invert the mapping information to create a mapping from the URL to the local search cluster ID. Mapping component 410 may then store all or some of the information associated with the cluster ID in web search index storage 420 with the appropriate URL (act 650). For example, mapping component 410 may store the contact information for the Clift Hotel (e.g., the address and telephone number stored at entries 500-2 and 500-3) in web search index storage 420 with the URL for the Clift Hotel. In this manner, information associated with a particular web page stored in web search index storage 420 may include, for example, a hyperlink to the web page, a snippet of text associated with the particular web page along with contact information (e.g., address and telephone number). For example, the entry associated with www.clifthotel.com may include the name and snippet associated with the Clift Hotel, along with the address and telephone number for the Clift Hotel. Search engine system 225 may then provide the local search related information when providing search results to clients 210, as described in more detail below.

Figure 7:
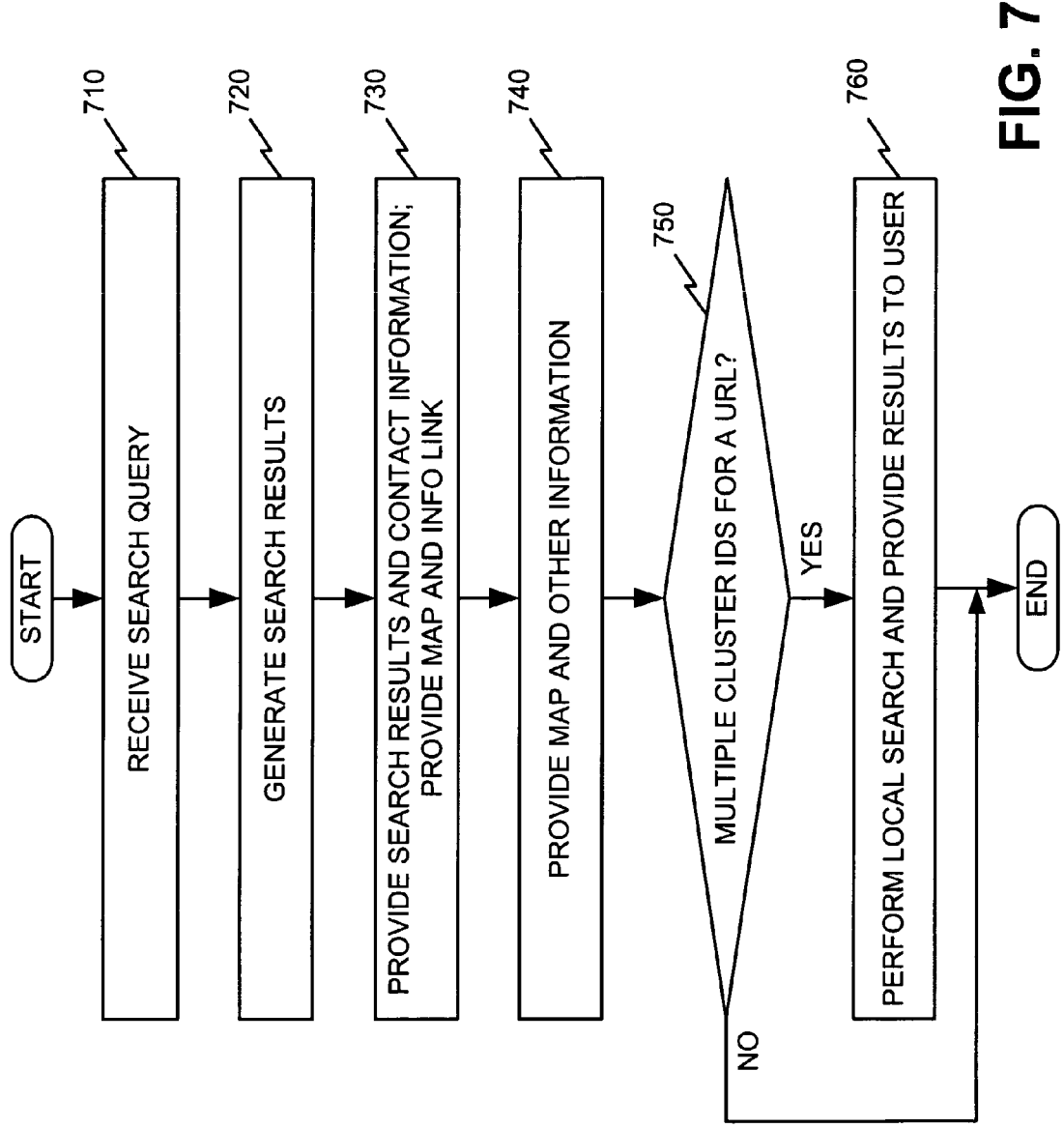
FIG. 7 is a flow diagram illustrating exemplary processing associated with providing search results and local search information in an implementation consistent with the principles of the invention.

FIG. 7 illustrates exemplary processing associated with providing search results and local search information in an implementation consistent with the principles of the invention. The processing described below uses the example of providing search results via a network, such as network 240. The techniques described herein, however, may be used in any search system. Processing may begin with a client 210 accessing server 220 via network 240 and receiving a user interface (UI) for entering a search query. Alternatively, client 210 may have a toolbar associated with search engine system 225 loaded on client device 210 that facilitates entry of search queries.

Assume that the user enters a search query via client 210 and transmits the search query to server 220 via network 240. Search engine system 225 may receive the search query (act 710). In an exemplary implementation, search component 430 receives the search query, executes the search and generates search results (act 720). These search results may include advertisements based on the search query. In addition, search engine system 225 may identify local search related information, such as an address and telephone number, associated with one or more of the particular search results.

For example, assume that a query from one of clients 210 is "Clift". In this case, further assume that search engine system 225 generates search results that that include a link associated with a web site for the Clift Hotel in San Francisco, Calif. Further assume that web search index storage 420 stores local information associated with the Clift Hotel, as described above. For example, assume that web search index storage 420 stores the address and telephone number for the Clift Hotel in San Francisco, Calif. with the listing for www.clift-.com. In this case, search component 430 retrieves the address and telephone number of the Clift Hotel in San Francisco along with the title/hyperlink to the Clift Hotel and a snippet stored in web search index storage 420. The search results and contact information may then be provided to the user (act 730).

Figure 8:
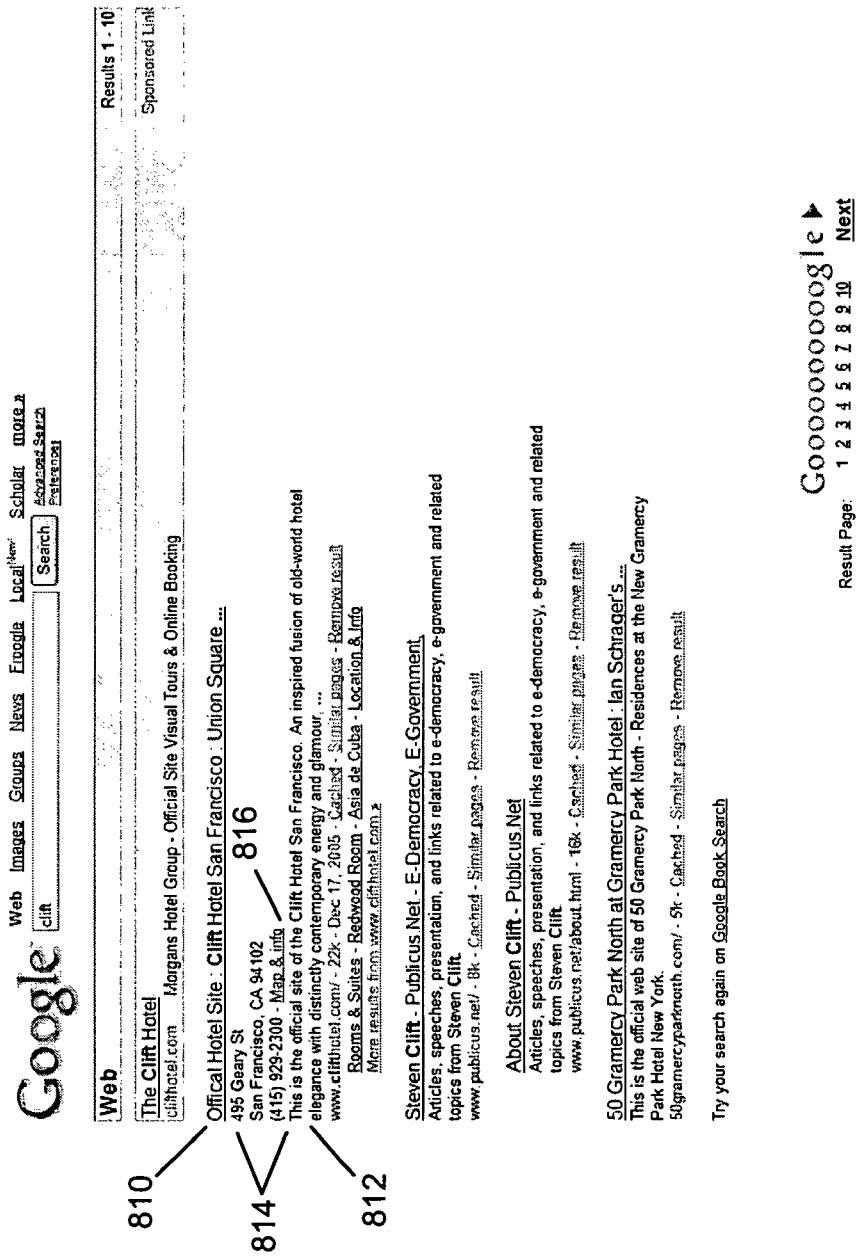

FIG. 8 illustrates an exemplary user interface screen 800 provided to the user at act 730. Referring to FIG. 8, search engine system 225 may provide a title and hyperlink for a web page at area 810 and a snippet associated with the web page at area 812. According to an exemplary implementation consistent with the invention, search engine system 225 may also provide the address and telephone number for the Clift Hotel at area 814. As illustrated in FIG. 8, providing the contact information after the title and before the snippet makes it very easy for the user to find the address and telephone number, as opposed to placing the contact information over top of the search results. This makes it more likely that the user will be able to clearly see the contact information.

Search engine system 225, consistent with the invention, may also include a link to a map and other information associated with the Clift Hotel, as indicated by the Map & info link at area 816 (act 730). This link may be selected by the user to provide a map and additional information to the user (act 740). For example, assume that the user selects the Map & info link at area 816. After selecting the link, search engine system 225 may provide a user interface screen 900 to the user, as illustrated in FIG. 9. Referring to FIG. 9, user interface screen 900 may include a map at area 910 that shows the location of the Clift Hotel. A user may be able to zoom in or out on the map by clicking on the appropriate controls associated with the map. In this manner, the map is automatically provided to the user without requiring the user to access another web site and enter an address.

Although not described in detail herein, search engine system 225 may store latitude and longitude information associated with addresses of various items of interest. For example, search engine system 225 may store latitude and longitude information associated with the address displayed at area 814 in FIG. 8. When a user selects the Map & info link at area 816 in FIG. 8, the latitude and longitude information is automatically provided to a map generator component that provides the map displayed at area 910.

Search engine system 225 may provide additional information associated with the Clift Hotel in San Francisco, Calif. via user interface screen 900. For example, as illustrated in FIG. 9, user interface screen 900 may include additional telephone numbers for the Clift Hotel at area 920 and other information associated with the Clift Hotel at area 930. In an exemplary implementation, user interface screen 900 may represent a landing page associated with the Clift Hotel that includes information stored by local search data storage 230 and search engine system 225. This landing page information, as illustrated in FIG. 9, may include, for example, pricing for hotel rooms, ratings for the hotel, parking information, etc. The information may be collected from a number of sources and may be selected to provide the user with information that is likely to be of use or be relevant to a user. In addition, the selected information may be formatted on a user interface screen, such as user interface screen 900, in an easy to read manner that allows the user to quickly find information of interest.

In some instances multiple cluster IDs may exist for a single URL. For example, assume that a URL is the home page for a chain of restaurants, such as Wendy's. In this case, the URL for the home page may link to a number of cluster IDs associated with different individual restaurants. These cluster IDs and information associated with each of these cluster IDs may not be relevant to the user's search query. For example, a cluster ID associated with a Wendy's restaurant in New York City will probably not be relevant to the user in San Francisco searching for a Wendy's restaurant. Therefore, search engine system 225 may determine whether multiple cluster IDs exist for a single URL generated in the search results (act 750). If multiple cluster IDs exist for a single URL, search engine system 225 may not provide the local information (e.g., address and telephone number) along with the search results returned to the user.

Alternatively, search engine system 225 may provide a link to the local search system to search for the business name near the user's location. For example, the search engine system 225 may identify the user's location based on an Internet protocol (IP) address of the user's client device 210. That is, search engine system 225 may be able to identify a geographical location of client device 210 based on the IP address associated with the user's search query. In another alternative, search engine system 225 may be able to identify the user's location based on receipt of a cookie included with the search query. For example, if the user has previously performed a local search using search engine system 225, search engine system 225 may have requested that the user enter an address associated with the user. In this case, in subsequent accesses of search engine system 225, a cookie including the user's location/address may be provided to search engine system 225. In either of these cases, search engine system 225 may automatically perform a local search using the location information associated with the user and identify the appropriate local search business listing. Search engine system 225 may then provide the appropriate contact information (e.g., address and telephone number) as well as the link to a map and other information based on the identified business location (act 760).

If no particular business contact information and/or map can be located using the local search, search engine system 225 may not identify any local information for that particular search result and may also not provide a link to a map and other information with that particular search result.

In another alternative implementation, if multiple cluster IDs exist for a single URL, search engine system 225 may provide a link to the local search system with one or more of the search results. In this case, if the user selects the link, the local search engine system may automatically enter the search query and location information and display local search results with that query. The location information in this query may be automatically identified by the IP address associated with the user, a cookie received by search engine system 225 or some other method. Alternatively, the local search engine system may provide an input box to allow the user to enter the desired location after the user selects the link.

CONCLUSION

Implementations consistent with the principles of the invention may provide enhanced search results that include contact-related information. This contact information may allow the user to find the information of interest very quickly. The enhanced search results may also include a link to a map and other information that allows the user to view additional information in a manner that requires little to no additional input from the user.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 6 and 7, the order of the acts may be varied in other implementations consistent with the present invention. Moreover, non-dependent acts may be implemented in parallel.

Also, implementations consistent with principles of the invention have been described with respect to gathering and storing information associated with businesses and organizations from various sources and using this stored information to identify contact information for a business/organization. It should be understood that the local contact information could be gathered in a number of other ways. For example, in another implementation, search engine system 225 could extract address and/or telephone numbers from a web page and display that information with the search result that includes that web page. For example, if a web page has a single address and telephone number on the web page, search engine system 225 could extract that address and telephone number and display it with the web page's title/hyperlink and snippet when that web page is included as part of the search results.

In addition, in some implementations, the link to the map and other information may be provided with the search results, as opposed to requiring the user to select a link to the map/other information. In such implementations, the map and/or other information may be provided for only a certain number of the search results, such as a first predetermined number of most relevant results. In addition, directions to the item of interest may be automatically provided in some implementations along with the map or as a link provided with the map. In such implementations, the directions may be generated based on the location of the business associated with the search result and the location of the user. The user's location may be automatically determined based on an IP address associated with the user or a cookie received by the search engine system, as described above. In other implementations, the user's location may be determined based on global positioning system (GPS) information included with a user query or with a cookie included with a user query.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a server device, the method comprising:
   examining, by a processor of the server device, records in a local search database, each record of the examined records including a web site address and contact information, the contact information corresponding to at least one of a street address or a telephone number, each record of the examined records including a business or organization identifier;
   mapping, by the processor and based on the examining the records in the local search database, one of the business or organization identifiers to a plurality of web site addresses;
   selecting, by the processor, one web site address of the plurality of web site addresses for the one of the business or organization identifiers;
   associating, by the processor and in a search index, the one web site address with the contact information from one of the records in the local search database, the one of the records including the one web site address;
   receiving, by the processor, a search query from a user;
   generating, by the processor, search results based on the search query, where the generating search results includes:
      automatically identifying a geographic location of the user based on an Internet protocol address associated with the user; and
      using the identified geographic location to perform a local search;
   identifying, by the processor, at least one of a telephone number or a street address associated with a first search result of the search results using the search index; and
   providing, by the processor, the search results to the user, the search results including information specifying the at least one of a telephone number or a street address, the information specifying the at least one of a telephone number or a street address being provided in close proximity to the first search result on a user interface screen.

2. The method of claim 1, further comprising:
   providing a link to a local search system with the search results.

3. The method of claim 1, farther comprising:
   providing, on the user interface screen, a link associated with the first search result;
   automatically generating the map in response to selection of the link by the user;
   identifying additional information associated with the first search result in response to selection of the link by the user; and
   providing the map and the additional information for output together on another user interface screen, the additional information including information not included with the first search result.

4. The method of claim 3, further comprising:
   automatically providing first information associated with the first search result in response to selection of the link, the first information including information not included with the first search result.

5. The method of claim 4, where the first information comprises information associated with the first search result that is likely to be relevant to the user.

6. The method of claim 1, further comprising:
   automatically providing first information with the first search result and a map showing a location associated with the first search result to the user, the first information and the map being visually presented together on a second user interface screen.

7. The method of claim 1, where the providing the search results and information identifying at least one of a telephone number or a street address comprises:
   providing the telephone number and the street address to the user.

8. The method of claim 1, where the providing the search results and information identifying at least one of a telephone number or a street address further comprises:
   providing the telephone number, the address and a link to a map to the user for output together via the user interface screen, the telephone number, the street address and the link being visually presented below a title of the one search result on the user interface screen.

9. The method of claim 1, further comprising:
   providing a link to a map in association with the first search result on the user interface screen;
   providing the map to the user in response to selection of the link; and
   providing directions with the map to the user, the directions being based on a location of the street address associated with the one search result and the geographic location associated with the user.

10. A system implemented using one or more computing devices, comprising:
    means for examining records in a local search database, each record of the examined records including a web site address and contact information, the contact information corresponding to at least one of a street address or a telephone number, each record of the examined records including a business or organization identifier;

means for mapping, based on examining the records in the local search database, one of the business or organization identifiers to a plurality of web site addresses;

means for selecting one web site address of the plurality of web site addresses for the one of the business or organization identifiers;

means for associating, in a search index, the one web site address with the contact information from one of the records in the local search database, the one of the records including the one web site address;

means for generating search results based on a search query from a user, where the means for generating includes:
  means for automatically identifying a geographic location of the user based on an Internet protocol address associated with the user; and
  means for using the identified geographic location to perform a local search;

means for providing the search results and information identifying at least one of a street address or a telephone number associated with at least one of the search results to a user, the at least one of a street address or a telephone number associated with at least one of the search results being determined using the search index;

means for providing a link to a map associated with at least the one search result to the user; and means for automatically providing the map and other information associated with the one search result in response to selection of the link, the other information including information not included with the one search result.

11. The system of claim 10, further comprising:

means for providing a link to a local search system associated with an other one of the search results and not providing a link to a map for the other search result.

12. The system of claim 10, further comprising:

means for determining whether information associated with an other one of the search results identifies a plurality of locations associated with a first entity;

means for identifying a geographic location associated with the user; and means for providing information identifying a street address of one of the plurality of locations with the other search result based on the identified geographic location.

13. A system, comprising:

a computer-readable memory device containing instructions; and a processor coupled to the computer-readable memory device, the processor executing the instructions to cause the processor to:
  examine records in a local search database, each record of the examined records including a web site address and contact information, the contact information corresponding to at least one of a street address or a telephone number, each record of the examined records including a business or organization identifier,
  map, based on examining the records in the local search database, one of the business or organization identifiers to a plurality of web site addresses,
  select one web site address of the plurality of web site addresses for the one of the business or organization identifiers,
  associate, in a search index, the one web site address with the contact information from one of the records in the local search database, the one of the records including the one web site address,
  generate search results based on a search query,
  provide the search results and information identifying a telephone number and a street address associated with at least one of the search results to a user, the information identifying a telephone number and a street address associated with at least one of the search results being determined by using the search index,
  provide a link to a map associated with at least the one search result to the user,
  automatically provide the map to the user in response to selection of the link, and
  provide additional information associated with the one search result to the user in response to selection of the link, the additional information and the map being presented for output on a same user interface screen, and the additional information including information not included with the one search result, where, when generating the search results, the processor executes the instructions to cause the processor to:
  automatically identify a geographic location of the user based on an Internet protocol address associated with the user; and
  use the identified geographic location to perform a local search.

14. The system of claim 13, where when selecting the one web site address, executing the instructions causes the processor to:
  obtain web pages that correspond to the plurality of web site addresses, and
  ignore a particular web site address of the plurality of web site addresses when the web page, which corresponds to the particular web site address, includes a plurality of street addresses.

15. The system of claim 13, where when selecting the one web site address, executing the instructions causes the processor to:
  obtain web pages that correspond to the plurality of web site addresses, and
  ignore a particular web site address of the plurality of web site addresses when the web page, which corresponds to the particular web site address, includes contact information that conflicts with the contact information included in a set of the records in the local search database, the set of records being associated with the one of the business or organization identifiers.

16. A system, comprising:

a memory to store a search index that includes information associated with a plurality of businesses; and a server device to:
  examine records in a local business search database, each record of the examined records including a web site address and contact information, the contact information corresponding to at least one of a street address or a telephone number, each record of the examined records including a business identifier,
  map, based on examining the records in the local search database, one of the business identifiers to a plurality of web site addresses,
  select one web site address of the plurality of web site addresses for the one of the business identifiers,
  associate, in the search index, the one web site address with the contact information from one of the records in the local search database, the one of the records including the one web site address,
  receive a search query from a user,
  generate search results based on the search query, determine, using the search index, whether information associated with one of the search results includes information identifying a plurality of web pages, and identify a uniform resource locator corresponding to one of the plurality of web pages to include with the one search result based on one or more sources that provided the information identifying the plurality of web pages, provide, to the user, the search results and a link to a local search system, the one search result including the identified uniform resource locator, and at least one search result, of the search results, being associated with information specifying at least one of a telephone number or a street address using the search index, automatically identify, when the link is selected, a geographic location of the user based on an Internet protocol address associated with the user, and use the identified geographic location to perform a local search.

17. The system of claim 16, where the contact information comprises the street address and the telephone number of the one business and the server device:

accesses the search index to identify the street address and the telephone number associated with a search result associated with the one business, and provides the search result, the street address, the telephone number and a link to a map associated with the address to the user.

18. The system of claim 17, where the server device:

determines whether information in the memory associated with another one of the plurality of businesses includes information identifying a plurality of geographic locations, and when a generated search result identifies an other web page associated with the other business and the memory includes information identifying a plurality of geographic locations associated with the other business, provides the link to the local search system to the user with a search result associated with the other business.

19. The system of claim 16, where the server device:

generates search results in response to a second user query, determines whether information associated with one of the search results, in the search index, identifies a plurality of geographic locations associated with a first entity, identifies a geographic location associated with a user that submitted the second user query, when the information associated with the one of the search results identifies a plurality of geographic locations associated with the first entity, and provides information identifying a street address of one of the plurality of geographic locations with the one of the search results based on the identified geographic location.

20. A method performed by a server device, the method comprising:

examining, by a processor of the server device, records in a local search database, each record of the examined records including a web site address and contact information, the contact information corresponding to at least one of a street address or a telephone number, each record of the examined records including a business or organization identifier;

mapping, by the processor and based on examining the records in the local search database, one of the business or organization identifiers to a plurality of web site addresses;

selecting, by the processor, one web site address of the plurality of web site addresses for the one of the business or organization identifiers;

associating, by the processor and in a search index, the one web site address with the contact information from one of the records in the local search database, the one of the records including the one web site address;

receiving, by the processor, a search query from a user;

generating, by the processor, search results based on the search query;

determining, by the processor, whether a plurality of uniform resource locators are associated with one of the plurality of search results in the search index;

identifying, by the processor and when a plurality of uniform resource locators are associated with the one search result, one of the plurality of uniform resource locators to include with the one search result based on at least one of a source that provided the one uniform resource locator or information on a web page corresponding to the one uniform resource locator;

providing, by the processor and to the user, the search results and a link to a local search system, the one search result including the one uniform resource locator, and at least one search result, of the search results, being associated with information specifying at least one of a telephone number or a street address using the search index;

automatically identifying, by the processor and in response to selection of the link, a geographic location of the user based on an Internet protocol address associated with the user; and using, by the processor, the identified geographic location to perform a local search.

21. The method of claim 20, where the selecting the one web site address includes:

ignoring a particular web site address of the plurality of web site addresses based on a quantity of web pages on a web site, associated with the particular web site address.

22. The method of claim 20, where the selecting the one web site address includes:

obtaining web pages that correspond to the plurality of web site addresses, and ignoring a particular web site address of the plurality of web site addresses when the web page, which corresponds to the particular web site address, includes a plurality of street addresses.

23. A computer program product, tangibly stored on a computer-readable memory device, the product comprising instructions operable to cause a processor to:

examine records in a local search database, each record of the examined records including a web site address and contact information, the contact information corresponding to at least one of a street address or a telephone number, each record of the examined records including a business or organization identifier;

map, based on examining the records in the local search database, one of the business or organization identifiers to a plurality of web site addresses;

select one web site address of the plurality of web site addresses for the one of the business or organization identifiers;

associate, in a search index, the one web site address with the contact information from one of the records in the local search database, the one of the records including the one web site address;

receive search results that are responsive to a search query that is associated with a user, one of the search results being associated with a plurality of geographic locations in the search index;

automatically ascertain a geographic location of the user based on an Internet protocol address associated with the user;

identify, by performing a local search using the ascertained geographic location of the user, geographic location information associated with one of the plurality of geographic locations, the geographic location information including at least a street address; and output the search results, the geographic location information and a link to a map that shows a geographic location specified by the street address, the outputting being performed in response to the search query and not in response to selection of a link by the user.

24. The computer program product of claim 23, where the instructions operable to cause the processor to select the one web site address include instructions to cause the processor to:

obtain web pages that correspond to the plurality of web site addresses, compare the contact information from a set of the records, in the local search database, to contact information included within the obtained web pages, the set of records being associated with the one of the business or organization identifiers, and select a web site address associated with a web page, of the obtained web pages, that includes contact information that matches contact information from a record in the set of records.

25. The computer program product of claim 23, where the instructions operable to cause the processor to select the one web site address include instructions to cause the processor to:

submit a query to a domain name registry to obtain contact information; and compare the obtained contact information to contact information from a set of the records in the local search database, the set of records being associated with the one of the business or organization identifiers.

26. The computer program product of claim 23, where the one web site address is selected based on a source that provides the one web site address.

27. The computer program product of claim 23, where the one web site address is selected based on contact information stored in a domain name registry.

28. The computer program product of claim 23, where the instructions operable to cause the processor to select the one web site address include instructions to cause the processor to:

obtain web pages that correspond to the plurality of web site addresses, and ignore a particular web site address of the plurality of web site addresses when the web page, which corresponds to the particular web site address, includes a plurality of street addresses.

29. The computer program product of claim 23, where the instructions operable to cause the processor to select the one web site address include instructions to cause the processor to:

obtain web pages that correspond to the plurality of web site addresses, and ignore a particular web site address of the plurality of web site addresses when the web page, which corresponds to the particular web site address, includes contact information that conflicts with the contact information included in a set of the records in the local search database, the set of records being associated with the one of the business or organization identifiers.

30. The computer program product of claim 23, where the instructions operable to cause the processor to select the one web site address include instructions to cause the processor to:

ignore a particular web site address of the plurality of web site addresses based on a quantity of web pages on a web site, associated with the particular web site address.

31. The computer program product of claim 30, where the instructions operable to cause the processor to ignore the particular web site address include one or more instructions operable to cause the processor to:

compare the quantity of web pages to a threshold.

32. The computer program product of claim 23, where the instructions further include instructions operable to cause the processor to:

receiving a search query; and one or more instructions for providing, in response to receiving the search query, a plurality of search results to a client device using the search index, the plurality of search results including a search result corresponding to the one web site address and including the contact information.

* * * * *